United States Patent Office 3,440,335
Patented Apr. 22, 1969

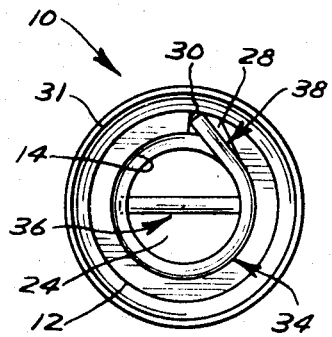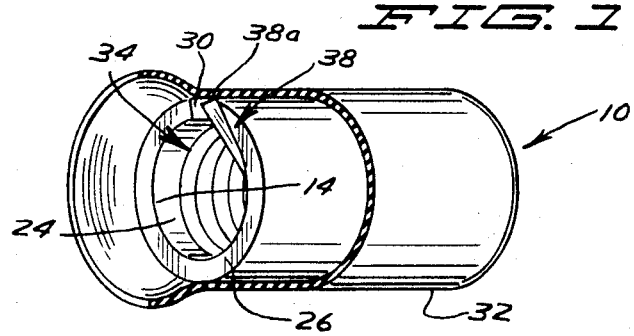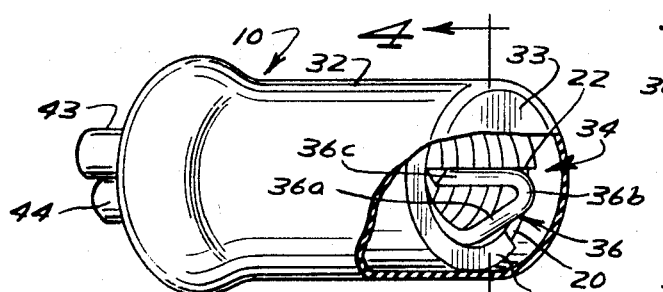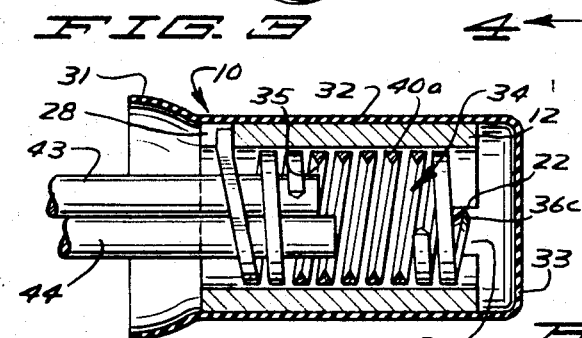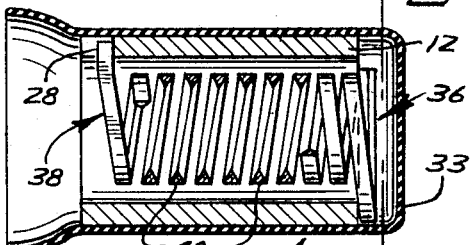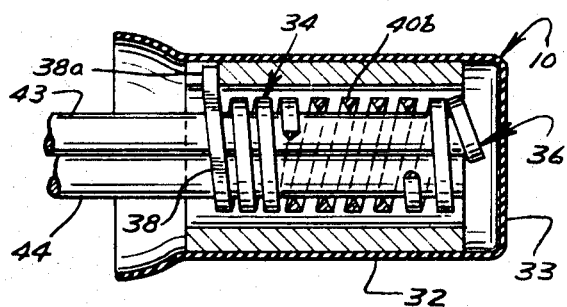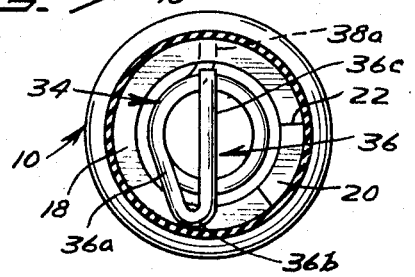
INVENTOR
JOHN H. BLOMSTRAND

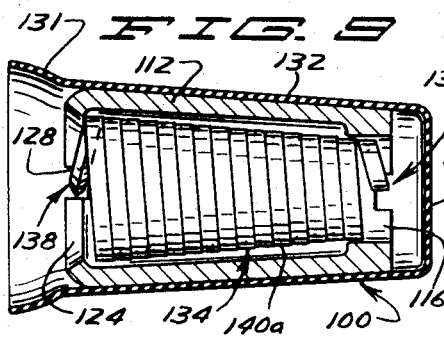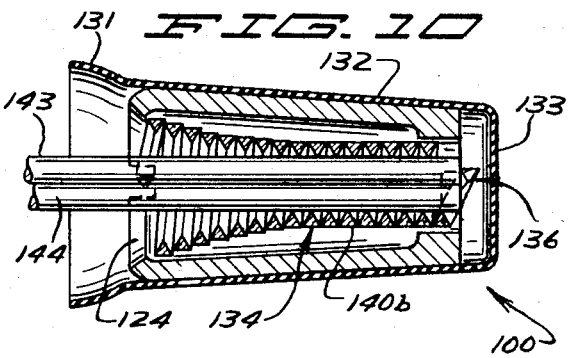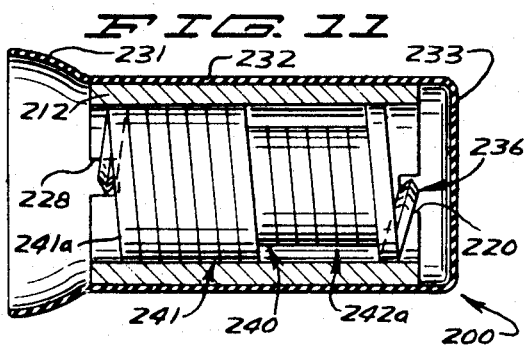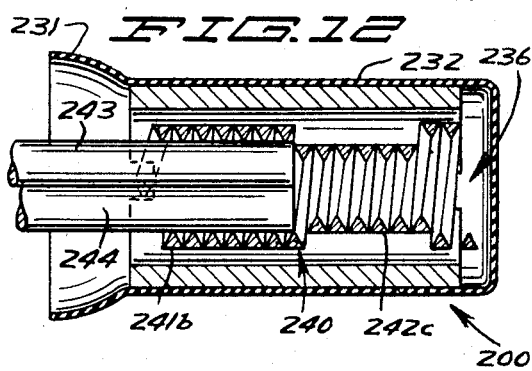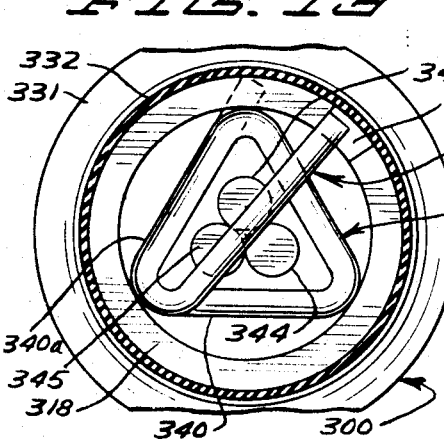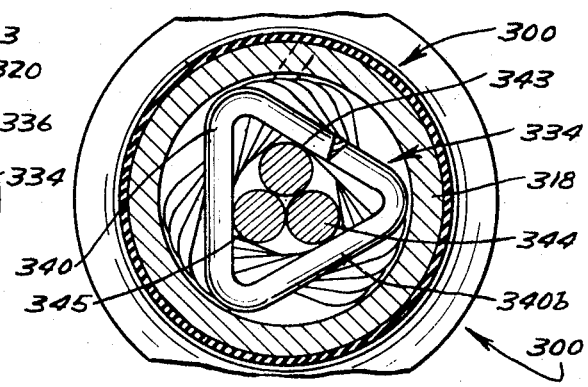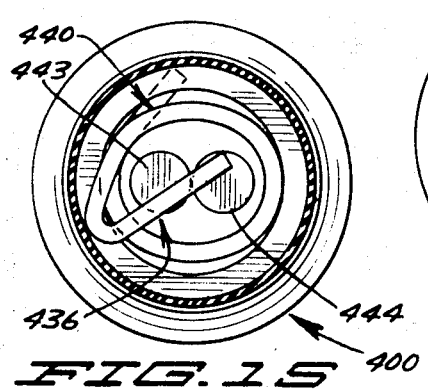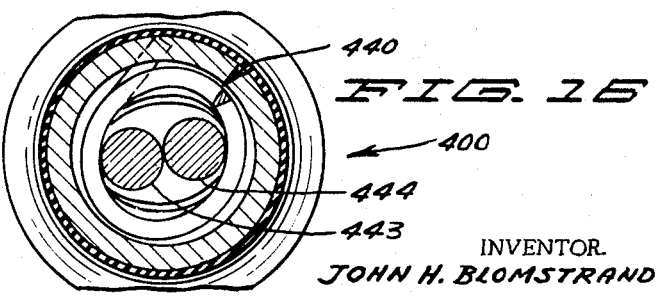

3,440,335
CONNECTOR WITH HELICALLY WOUND SPRING
FOR GRIPPING WIRES WHEN RELEASED
John H. Blomstrand, 214 Hazel Drive,
Corona Del Mar, Calif. 92625
Filed Feb. 2, 1967, Ser. No. 613,516
Int. Cl. H02g 15/08
U.S. Cl. 174—87                                21 Claims

ABSTRACT OF THE DISCLOSURE

An elongated hollow shell is notched at opposite ends for the purpose of maintaining a coil spring in a torsionally cocked condition, one end of the spring being held in one notch and the other end of the spring in the other notch. When one spring end is disengaged from its notch, the enlarged convolutions of the spring immediately contract against and thereby grip the wires that have been inserted into the spring.

BACKGROUND OF THE INVENTION

Field of the invention

This invention relates generally to devices for securing the ends of a plurality of wires together without resort to soldering, welding or the like, and pertains more particularly to a connector where the gripping action is provided automatically without manual effort on the part of the user.

Description of the prior art

A number of devices, such as the wire connector depicted in my U.S. Patent No. 2,656,204, have been devised, but these prior art devices require a manual twisting of the connector in order to effect the connection of the wires to be joined together. I do not in any way wish to disparage such devices for they have met with widespread commercial success, but the need for manual rotation requires a certain amount of personal effort on the part of the user. Even more important is that the speed with which wires can be connected with such prior art devices is relatively slow compared to my present device because the present connector can be sold or delivered in a cocked condition, thereby accelerating the connecting procedure. Also, this can be done without tools and can be done at a relatively low cost inasmuch as no critical metals need be employed. Furthermore, since the manual twisting required heretofore is obviated, the connector envisaged by the present invention can be quite small and compact.

SUMMARY OF THE INVENTION

Briefly stated, the invention comprises an insulated shell that contains a coil spring which is torsionally cocked at the factory so as to enlarge at least certain of the convolutions. One end of the spring is anchored to one end of the shell, and the other end of the spring is releasably engaged with a notch so that when that particular end of the spring is disengaged from the notch, the expanded or enlarged convolutions quickly contract so as to grip the wires that have been inserted. The convolutions may assume various configurations, and certain advantages are to be derived from such specific configurations. For instance, the convolutions can gradually taper in size so as to grip wires of different cross-sectional areas. Also, there can be a stepped change in the convolution size so as to grip either of two wire sizes. Still further, the convolutions can be modified so as to provide an enhanced camming action with respect to the wires to be joined together.

BRIEF DESCRIPTION OF THE DRAWINGS

FIGURE 1 is a perspective view of one form of my connector, the view being taken from the end at which the coil spring is fixedly anchored or retained;

FIGURE 2 is a left end view of the connector corresponding to FIGURE 1;

FIGURE 3 is a perspective view of the same connector, the view being taken from the opposite end and a portion of the insulating sleeve being broken away to show the releasable retention of that end of the spring with respect to the end depicted in FIGURES 1 and 2;

FIGURE 4 is an end view corresponding to FIGURE 3, the view being taken in the direction of line 4—4;

FIGURE 5 is a sectional view of the connector illustrated in FIGURES 1-4, but illustrating the coil spring in its cocked or charged condition which results in the enlargement of the convolutions so that a pair of wires can be readily inserted.

FIGURE 6 is a sectional view similar to FIGURE 5, but after the coil spring has been released so that the convolutions contract to grip the inserted wires;

FIGURE 7 is a sectional view of the same device but prior to torsionally winding the spring to enlarge the convolutions to the extent pictured in FIGURE 5;

FIGURE 8 is an end view taken in the direction of line 8—8 from the right of FIGURE 7;

FIGURE 9 is a sectional view corresponding generally to FIGURE 5 but in which the convolutions of the coil spring taper in size;

FIGURE 10 is a sectional view illustrating the embodiment shown in FIGURE 9 but depicting the spring after it has been released for the purpose of gripping the inserted wires;

FIGURE 11 is a sectional view also like FIGURE 5, but showing the convolutions of two different sizes so as to accommodate wires of two distinct sizes;

FIGURE 12 concerns the same embodiment as set forth in FIGURE 11, but illustrates the released condition of the coil spring, there being two wires of relatively large size held therein;

FIGURE 13 represents another embodiment of the invention, the convolutions in this instance being triangular and the view being an end view generally similar to that appearing in FIGURE 4;

FIGURE 14 is a cross-sectional view through an intermediate longitudinal portion of the connector illustrated in FIGURE 13, the view portraying the coil spring in its released condition;

FIGURE 15 is a view corresponding to FIGURE 13 but with the convolutions possessing an oval appearance in contradistinction to the triangular appearance of FIGURE 13, and FIGURE 16 is a cross-sectional view corresponding to FIGURE 14 but pertaining to the modification illustrated in FIGURE 15.

DESCRIPTION OF THE PREFERRED EMBODIMENTS

Referring first to the connector illustrated in FIGURES 1-8, it will be noted that this embodiment has been generally designated by the reference numeral 10. A rigid metal shell 12 has a bore 14 extending completely therethrough so as to provide an open end 16 at the right (FIGURES 3 and 4) which open end has a planar bearing surface 18 with the exception of an arcuate notch 20 which provides a stop or abutment 22 for a purpose hereinafter made manifest. Inasmuch as the bore 14 extends completely through the shell 12, the other end 24 is also open (FIGURES 1 and 2) and likewise there is a planar surface 26 but since no bearing function is performed at this end, the surface need not be planar, although there is an arcuate notch 28 which forms a stop or abutment 30 which performs a function that will be better understood as the description progresses. Encasing the metal shell 12 is a dielectric sleeve 32, such as vinyl, having a flared open entrance 31 and a closed opposite end 33. The sleeve 32 electrically insulates the shell 12 and for this reason is generally cylindrical without any notches therein, for it is desirable to have the notches 20 and 28 circumferentially covered or protected.

Within the bore 14 of the shell 12 is a coil spring generally denoted by the numberal 34 having a suitable cross-section (triangular as seen in FIGURES 5, 6 and 7) to provide a sharp biting edge 35. This spring 34 has a first end 36 and a second end 38. A series of resilient convolutions 40 reside intermediate the ends 36, 38 and inasmuch as these convolutions appear differently in FIGURES 5, 6 and 7 (also FIGURE 8 since it is an end view of FIGURE 7), different letter suffixes are assigned to the numeral 40 so as to visually differentiate between these figures. For instance, the convolutions 40 in FIGURE 5 are enlarged and they have been denoted by the reference numeral 40a. In FIGURE 6, the convolutions are somewhat smaller in size and they have been indicated by the reference numeral 40b, whereas in FIGURE 7, they are in their normal or unexpanded state and have been given the reference numeral 40c.

Attention is now focused on the configuration of the first spring end 36. It will be noted that this end is composed of a tangential section 36a, a reversely bent bight section 36b and a transverse or diametrically disposed section 36c. From FIGURES 3 and 4, it will be appreciated that the transverse section 36c serves to partially obstruct or block the open end 16 of the shell 12. On the other hand, the end 24 of the shell is to remain completely open and unobstructed, so that the end 38 forms a tangential section 38a which provides no interference for the insertion of a pair of wires 43, 44 which are to be joined together, such wires appearing in FIGURES 3-6.

Having presented the foregoing description of the components incorporated into the embodiment labeled 10, it will now be of benefit to explain in detail how the cocked or charged condition of the coil spring 34 is realized. FIGURES 7 and 8 have been presented for the purpose of showing the size of the convolutions 40 prior to enlargement. These convolutions have been given the reference numeral 40c. Close inspection of FIGURES 7 and 8 will reveal that there is a fair amount of clearance between the convolutions 40c and the inside of the shell 12. Thus, the size of the convolutions 40c represents the normal of unenlarged condition of these convolutions.

When the first spring end 36 is twisted or turned in a clockwise direction as viewed in FIGURE 8, this torsionally winds the spring 34 with the consequence that the convolutions 40 are enlarged from the condition denoted by the reference numeral 40c. This enlarged state of the convolutions is depicted in FIGURE 5 and the convolutions because of their increased size bear the reference numeral 40a. More specifically, the spring end 36 has been rotated from its position of FIGURE 8 through approximately 270° to reach the notch 20 and this causes the convolutions to become enlarged. Of course, the reversely bent bight 36b then resides in the notch 20 as is clearly evident in FIGURES 3 and 4, although FIGURE 5 represents this same cocked or charged condition.

In use, the person wishing to connect the two wires 43, 44 together merely has to insert the wires through the open end 24 as is happening in FIGURE 5. For the sake of discussion, the wire 44 has its end slightly advanced with respect to the end of the wire 43. What occurs is that the end of the wire 44 will abut the transverse section 36c of the first spring end 36 so as to move the section 36c and since it is integral with the bight 36b, the bight is disengaged from the notch 20. Up to this time, the bight 36b has been contacting the stop or abutment 30 which has prevented the spring 34 from unwinding. In other words, the first end 36 of the coil spring 34 has been retained in an angularly displaced position with respect to the second end 38 of the spring to torsionally cock the spring. It is important to appreciate that this torsional winding or cocking of the coil spring can be done at the factory and that the user is not in any way responsible for having to perform this task.

At any rate, when either of the wires 43 or 44, the wire 44 being the responsible one in this situation, abuts the end 36 of the spring, more specifically the transverse section 36c thereof, there is a disengagement of the bight 36b from its notch 20 and the helically wound spring then immediately unwinds by reason of the disengagement of the spring end 36. The convolutions 40 do not return to their original state as indicated by the reference numeral 40c in FIGURE 7 because they are prevented from doing this owing to the presence of the wires within the convolutions.

It will be understood that the first end 36 can be twisted or rotated to whatever extent is desired. Thus, while we have considered ¾ of a revolution, this could be 1¾ or the notch 20 could be angularly oriented with respect to the notch 24 to any angular extent that is desired. Still further, the spring constant of the coil spring 34 can be selected so that an extremely strong gripping action is applied to the wires 43, 44. It will be remembered that the torsional winding of the coil spring 34 is to be done at the factory where equipment can be made available for this job. Consequently, a much greater gripping action can be provided by virtue of the cocked or torsionally wound condition of the coil spring 34 than if manual rotation is resorted to as in the prior art hereinbefore mentioned, and the retention of the wires is appreciably enhanced by the relatively sharp edge 35 which bites or cuts into the wires.

Although in the majority of the situations that would usually be encountered when desiring to join wires together, it will be appreciated that the embodiment 10 would have to be designed for a prescribed range of wire sizes because when contracting from the condition depicted in FIGURE 5 to that depicted in FIGURE 6, the wires must have a combined cross-section of sufficient size so that the convolutions do not return to their original size as pictured in FIGURES 7 and 8. To accommodate a larger number of wire sizes, the embodiment of FIGURES 9 and 10 would be helpful, this embodiment being assigned the reference numeral 100. As can be readily seen, the metal shell 112 has a tapered shape and the bore 114 decreases in size from the left to the right. Hence, the open end 116 is smaller than the open end 118.

Attention is directed to the arcuate notch 128 in the embodiment 100 because it is at a different angular location from the notch 28 in the embodiment labeled 10. This is done largely for drafting simplicity, but does have the advantage of illustrating quite vividly that the notches do not have to be specifically located with respect to each other. As a matter of fact, there could be four notches 28 or 128, these notches being quadrantly located with respect to each other, in order to give a choice as to where the second end 38 or the second end 138 is located.

Inasmuch as the shell 112 is tapered, the sleeve 132 in FIGURES 9 and 10 is also tapered to conform to the shape of the sleeve, there being the flared entrance 131 to facilitate insertion of the wires and the closed end 133 to provide complete insulation as in the connector 10.

It is the coil spring 134 that is quite different from the coil spring 34. Whereas the coil spring 34 is composed of convolutions 40 having the same diameter or transverse dimensions, the convolutions 140 are composed of convolutions that decrease in size from the left to the right. The reason for this is to accommodate wires of different sizes. As shown, the wires 143 and 144 are slightly smaller than the wires 43 and 44. By virtue of the relatively small size, these wires can be inserted completely through the coil spring 134 so as to abut the first spring end 136. This situation is clearly portrayed in FIGURE 10 and the ends of the wires 143, 144 are causing in this figure the spring end 136 to be disengaged or dislodged from its notch 120.

Assuming that the wires 143, 144 are somewhat larger than shown in FIGURE 10, then they naturally would not be inserted as far as they appear in FIGURE 10. However, when the ends of these somewhat larger wires strike any of the convolutions intermediate the coil spring ends 136 and 138, the convolutions would be urged together from that location on to the right, the convolutions bearing against each other so as to force the end 136 out of its notch 120. If the wires are very large, they will only go into the coil spring 134 a short distance but still the disengagement will automatically happen by reason of the resulting compressed state of the convolutions from that point on to the extreme right and thus to the end 136.

Perhaps it should be explained that the convolutions that are enlarged, these being the convolutions in FIGURE 9, have been denoted by the reference numeral 140a, and the contracted convolutions, these being in FIGURE 10, by the reference numeral 140b. It is not thought necessary to show the natural size of these convolutions as was done with respect to embodiment 10, more specifically as illustrated in FIGURES 7 and 8, for the principles involved should now be clearly evident.

Passing now to another modification, FIGURES 11 and 12 are concerned with this particular embodiment which has been generally designated by the reference numeral 200. The metal shell 212 is identical to the shell 12 with the exception of the location of the notch 228. The salient difference exists in the utilization of convolutions 240 that are of two different sizes. The convolutions are still circular, but the series of convolutions labeled 241 which approximate half of the length of the coil spring 240 are larger than the remaining convolutions designated by the reference numeral 242. Since FIGURE 11 represents the cocked or charged state of the device 200, the convolutions there have been labeled 241a and 242a. The suffix a is again used in the same sense that it was used to designate the enlarged size of the convolutions 40a in FIGURE 5. Consequently, when the wires 243 and 244 are inserted into the convolutions 241a, the convolutions 241a are sufficiently enlarged so as to allow the wires 243, 244 to go completely through these convolutions, but the cross-sectional size of the wires 243, 244 has been deliberately selected so that they will not pass into the convolutions 242a.

Hence, when the ends of the wires 243, 244 abut the first smaller convolution 242a, there is a forcing of the spring end 236 out of its notch 220 with the consequence that the helically wound coil spring is released or unwound and the convolutions 241a contract to grip the inserted wires. Actually, it may be questioned as to why the convolutions to the right in FIGURE 12 are represented by the reference numeral 242c, but these convolutions are free to resume their normal minimal size and thus correspond to the convolutions 40c in FIGURE 7 and FIGURE 8 of embodiment 10. Of course, if the wires 243, 244 were sufficiently small so as to enter the convolutions 242a in FIGURE 11, then they would go all the way through and one of the wire ends would abut the first end 236 to effect the release or disengagement of the end 236 from its notch 220; this is believed readily apparent without actually portraying this condition or situation. As with the embodiments already described, a dielectric sleeve 232 with its entrance 231 and closed end 233 is included.

Another embodiment is illustrated in FIGURES 13 and 14, and this embodiment has been given the reference numeral 300. Here again, there are many similarities and these need not be described in detail, it being easier to described the differences. The coil spring 334 in this instance is composed of polygonal convolutions 340 which have a triangular shape. To carry through with the suffix system, the convolutions 340 in their enlarged state have been distinguished by the reference numeral 340a and in their contracted state have been assigned the reference numeral 340b. To allow full identification of the parts, the sleeve 332 has been labeled, tobether with its entrance 331.

This embodiment is especially suited for gripping several wires and the wires have been indicated by the reference numerals 243, 344 and 345. As can be seen from FIGURE 13, the combined cross-sectional areas of these wires 343, 344 and 345 are such as to allow them to be freely inserted within the coil spring 334. However, when, say, the wire 346 abuts the first spring end 336, it is pushed out of its notch 320 and the spring end 336 is free to spin around on the bearing surface 318. This allows the spring 334 to immediately unwind and the convolutions assume the contracted state in FIGURE 14. The various convolutions are angularly shifted with respect to each other as is clearly apparent in FIGURE 14 and the wires 343, 344 and 345 are tightly cammed together to provide an excellent electrical connection or juncture.

A further embodiment that is very effective is shown in FIGURES 15 and 16, this embodiment being designated in its entirety by the reference numeral 400. It will be apparent that the convolutions 440 possess an oval appearance and the wires 443 and 444 can be easily inserted as indicated in FIGURE 15, yet when the end 436 is abutted, there is a triggering of the coil spring 434 so that it contracts to firmly grip the wires as shown in FIGURE 16. Here again, a camming action is derived that forces the wires tightly against each other, there being an extreme amount of force applied in a horizontal direction from the left and a similar force applied horizontally from the right. Thus, the wires 443 and 444 in this instance are constrained to remain in the horizontal position in which they appear in FIGURE 16 and good line contact is provided throughout the length of the inserted ends. Once again, it is believed desirable to identify the insulating sleeve 432 and its flared entrance 431.

In summation, it is important to appreciate that there is no manual effort involved when using a connector of the foregoing general type. The spring is pre-loaded so that all that need be done by the user is to trigger its release. This release has been highly simplified by having the inserted wires themselves cause the release with a concomitant automatic gripping of the inserted wires.

The amount of gripping action can be determined by various parameters and these parameters are not left to the choice of the user; hence, the requisite amount of gripping or holding action can be more accurately controlled than with the prior art devices hereinbefore alluded to, and the gripping action is derived virtually instantaneously with the arrangement embodied in my connector.

I claim:

1. A connector for gripping and holding a plurality of wires comprising a coil spring having first and second longitudinally spaced ends and a series of intermediate resilient convolutions, said spring being supported by a relatively rigid member having substantially the same length as said coil spring for releasably retaining said first end in an angular displaced position with respect to said second end torsionally cocking said spring and transversely enlarging at least some of said convolutions for the reception of the plurality of wires to be gripped, said member having a generally longitudinally directed abutment at one end and said first spring end having a transverse section thereof bearing against said abutment to maintain said torsionally cocked condition, whereby when said section is forced beyond said abutment said first end is released and said enlarged convolutions contract to grip and hold said wires.

2. A connector in accordance with claim 1 in which said member constitutes an elongated shell containing said spring, at least one end of said shell being open and having said abutment disposed thereon with said first spring end being releasably retained with respect to said shell adjacent said open end.

3. A connector in accordance with claim 2 in which said abutment constitutes one side of a notch.

4. A connector in accordance with claim 3 in which said open end is planar except for said notch, and said first spring end has a section thereof partially blocking said open end, and a section residing in said notch, the other end of said shell also being open to allow insertion of the ends of said wires, whereby sufficient insertion of at least one of said wire ends will cause it to abut said partially blocking section to cause disengagement of the section residing in said notch and thus effect release of said first spring end to allow said enlarged convolutions to grip and hold said wires.

5. A connector in accordance with claim 4 in which said first spring end is reversely bent to form said sections.

6. A connector in accordance with claim 5 in which the other end of said shell is also formed with a notch for fixedly retaining said second spring end.

7. A connector in accordance with claim 6 in which said second spring end projects outwardly with respect to said convolutions into the notch into the other end of said shell.

8. A connector in accordance with claim 7 in which said shell is of metal and said connector further includes an outer sleeve of dielectric material.

9. A connector in accordance with claim 1 in which said convolutions are generally circular.

10. A connector in accordance with claim 1 in which said convolutions decrease in diameter from said second spring end toward said first spring end.

11. A connector in accordance with claim 1 in which approximately half of the convolutions nearer said second spring end have a relatively large diameter and the majority of the remaining convolutions have a relatively small diameter.

12. A connector in accordance with claim 1 in which said convolutions are polygonal.

13. A connector in accordance with claim 12 in which said convolutions are generally triangular.

14. A connector in accordance with claim 1 in which said convolutions are generally oval.

15. A connector for gripping and holding a plurality of wires comprising an open-ended metallic shell having a notch at each end, a dielectric sleeve encasing said shell, and a coil spring contained in said shell havng a first end releasably engaged in one of said notches and a second end anchored in the other notch, sad notches retaining said first spring end in an angularly displaced position with respect to said second spring end torsionally cocking and transversely enlarging the convolutions comprising said spring, at least certain of said convolutions becoming sufficiently enlarged from their initial size to allow insertion of a plurality of wire ends of a cross-section that would not be normally accommodated without enlargement, whereby release of said first end will cause unwinding thereof and a concomitant contraction of said certain convolutions with an automatic gripping of the inserted wires.

16. A connector in accordance with claim 15 in which said first spring end has a section thereof extending centrally across the open end of said shell formed with said one notch therein and in which said second spring end resides closely adjacent said shell leaving the opened end of said shell having the other notch therein sufficiently unobstructed to allow insertion of said wire ends.

17. A connector in accordance with claim 15 in which the convolutions of said spring have a non-circular cross-section for providing a relatively sharp edge engageable with said wires.

18. A connector for gripping and holding a plurality of wires comprising a coil spring having first and second longitudinally spaced ends and a series of intermediate resilient convolutions, said spring being supported by a relatively rigid member having a longitudinal portion of substantially the same length as said coil spring releasably retaining said first end in angularly displaced position with respect to said second end torsionally cocking said spring and transversely enlarging at least some of said convolutions for the reception of the plurality of wires to be gripped, said member having a generally longitudinally directed abutment at one end of said longitudinal portion and said first spring end having a transverse section thereof engaging against said abutment maintaining said torsionally cocked condition and said member additionally having a bearing surface extending from the end of said abutment in a direction away from said abutment, whereby when said transverse section is forced beyond said abutment onto said bearing surface for sufficient movement thereover so that said first end is released and said enlarged convolutions contract to grip and hold said wires.

19. A connector in accordance with claim 18 in which said member constitutes an elongated shell containing said spring, the ends of said shell determining the length of said longitudinal portion and said bearing surface residing in a plane at one end of said shell.

20. A connector for gripping and holding a plurality of wires comprising a coil spring having a series of resilient convolutions with an axial bore extending therethrough, said spring being supported by a relatively rigid member having substantially the same axial length as said coil spring, means preventing angular displacement of one end of said coil spring with respect to the end of said member adjacent thereto, said member having a longitudinally directed abutment thereon at its opposite end, first means on the opposite end of said coil spring engaging said abutment releasably retaining the opposite end of said coil spring in an angularly displaced position with respect to said one end torsionally cocking said spring and transversely enlarging at least some of said convolutions for the reception of the plurality of wires to be gripped, and second means at least partially blocking the bore at said opposite spring end and connected to the last-mentioned means to move said last mentioned means beyond said abutment when said wires are inserted sufficiently so that at least one wire abuts said last-mentioned means, whereby disengagement of said first means allows said enlarged convolutions to contract in the direction of said wires and thereby cause gripping and holding thereof.

21. A connector in accordance with claim 20 in which said member constitutes an elongated shell containing said spring and of a transverse size providing clearance with respect to said convolutions permiting said enlargement thereof, at least one end of said shell being open and having a notch therein one side of which forms said abutment, said first means constituting a reversely bent and outwardly projecting section of said coil spring and said second means constituting an inwardly directed transverse section of said spring against which at least one of said wires abuts to disengage said reversely bent section from said notch.

References Cited

UNITED STATES PATENTS

| | | | |
|---|---|---|---|
| 704,869 | 7/1902 | Fischer et al. | 287—104 |
| 3,308,229 | 3/1967 | Burniston | 174—87 |

FOREIGN PATENTS

| | | |
|---|---|---|
| 380,393 | 9/1932 | Great Britain. |

DARRELL L. CLAY, *Primary Examiner.*

U.S. Cl. X.R.

85—32; 151—14; 287—75

U.S. DEPARTMENT OF COMMERCE

PATENT OFFICE

Washington, D.C. 20231

UNITED STATES PATENT OFFICE
CERTIFICATE OF CORRECTION

Patent No. 3,440,335            April 22, 1969

John H. Blomstrand

It is certified that error appears in the above identified patent and that said Letters Patent are hereby corrected as shown below:

Column 3, line 33, "numberal" should read -- numeral --; line 57, after "so" cancel "that". Column 6, line 19, "dieleectric" should read -- dielectric --; line 25, "described" should read -- describe --; line 33, "tobether" should read -- together --; line 36, "243" should read -- 343 --. Column 7, line 15, after "spring" cancel "for". Column 8, line 4, "sad" should read -- said --. Column 9, line 4, "permiting" should read -- permitting --.

Signed and sealed this 3rd day of February 1970.

(SEAL)
Attest:

Edward M. Fletcher, Jr.            WILLIAM E. SCHUYLER, JR.

Attesting Officer                     Commissioner of Patents